United States Patent Office 3,313,860
Patented Apr. 11, 1967

3,313,860
PRODUCING PARA- AND META-TERTIARY-BUTYLTOLUENES
James L. Willis, Jr., Beaumont, Tex., assignor to Mobil Oil Corporation, a corporation of New York
No Drawing. Filed Mar. 6, 1964, Ser. No. 350,090
6 Claims. (Cl. 260—671)

This invention relates to the production of tertiary-butyl alkylbenzenes and is more particularly concerned with the catalytic alkylation of toluene to form relatively high ratios of p-tertiary-butyltoluene.

The formation of the isomers of tertiary-butyltoluenes by the catalytic alkylation of toluene and the like with isobutylene, diisobutylene, triisobutylene or the like has been variously disclosed. The catalysts suggested for such reactions have included solid phosphoric acid, ferric chloride, aluminum chloride, hydrofluoric acid, concentrated sulfuric acid up to 99%, and the like. Some of these processes have been effective to some degree to make mixtures of the meta, and para isomers, but conversion to the more desired p-tertiary butyl alkylbenzene may be low unless operating conditions are accurately controlled. The difficulties of adequate control and the nature of the catalyst frequently render many processes to costly for commercial utilization.

An object of this invention is to produce various t-butyl alkylbenzenes by using cheap and readily available catalysts. Another object is to produce a t-butyl alkylbenzene material containing a high percentage of the para isomer. A further object is to provide a cheap alkylation catalyst which has a long life and which can easily be reactivated if desired. A still further object is to provide the described alkylation processes in which the reaction products are easily and economically recovered and in which unused reactants are readily available for re-use. Other objects and advantages of this invention will become apparent to those skilled in the art, from the following detailed description.

These and other objects are attained by alkylating a monoalkylbenzene in which the alkyl radical contains between 1 and 4 carbon atoms, with an isobutylene reactant, i.e., mono- or poly-isobutylene, using as the alkylation catalyst, certain naturally basic or neutral clays which have not been subjected to chemical treatment.

To practice the process of this invention, the monoalkylbenzene is mixed with about 30–60% of the stoichiometric quantity of the isobutylene reactant and the mixture is preheated to the desired reaction temperature. The preheated mixture is then passed through a fixed bed of the clay catalyst at an LHSV (Liquid Hourly Space Velocity—unit volume liquid feed per unit volume catalyst per hour) of between about 0.5 and about 1.0. Temperatures and pressures of the reaction are controlled at values which will be, respectively, in the ranges of between about 300° F. and about 600° F. and between about 200 p.s.i.g. and about 400 p.s.i.g., preferably between about 300° F. and about 400° F. and at between about 200 p.s.i.g. and about 300 p.s.i.g. The use of an excess of the monoalkylbenzene over the stoichiometric amount, reduces the formation of generally undesired disubstituted products. The liquid effluent from the reactor is fractionated to separate the t-butyl alkylbenzene product from unreacted alkylbenzene and the latter is returned to the reaction. Unreacted isobutylene from the reactor is in the vapor state and is also returned to the reaction. Any suitable type of apparatus may be used for the alkylation and recovery steps.

Example 1

A run was carried out using calcined Attapulgus clay, (which had not undergone any chemical treatment, such as acid activation) as the catalyst in a fixed catalyst bed. In this run, the reaction mixture, containing toluene and mono-isobutylene in the mole ratio of 3.35:1, was preheated to about 300° F. and was passed through the catalyst bed at an LHSV of 0.5 for about 3 hours. The reactor was maintained at a pressure of 200 p.s.i.g. and at a temperature of 300° F. The reaction product contained 8.2 wt. percent p-tertiarybutyl toluene, which amounts to 25 wt. percent conversion of the isobutylene. The ratio of para-isomer to meta-isomer (p/m) was 4.3.

Example 2

A series of runs were made using calcined Attapulgus clay catalyst, as described in Example 1, in a fixed catalyst bed reactor for the entire series, varying the times, temperatures and pressures as indicated in the table, with the results shown therein. The reaction mixture charged to the reactor contained toluene and mono-isobutylene in the mole ratio of 3.35:1 and was fed to the catalyst bed at an LHSV of 0.5.

| Cumulative Operating Time of Catalyst, Hrs. | p-Tert. Butyltoluene in Product, Vol. Percent | Ratio of p/m in Product | Conversion of Isobutylene to Mono-tert. Butyltoluene, Wt. Percent | Reactor Temperature, °F. | Reactor Pressure, p.s.i.g. |
|---|---|---|---|---|---|
| 5.50 | 13.0 | 3.7 | 41 | 300 | 300 |
| 9.25 | 21.5 | 2.3 | 77 | 400 | 200 |
| 10.50 | 24.5 | 2.6 | 85 | 400 | 300 |
| 14.00 | 11.3 | 2.5 | 40 | 400 | 400 |
| 16.75 | 8.3 | 1.9 | 32 | 500 | 300 |
| 20.00 | 5.3 | 2.2 | 19 | 400 | 300 |

The catalysts used in the process of this invention are chemically neutral or basic clays. These clays may be calcined. They are not, however, subjected to any chemical treatment or modification. In particular, they are not acid activated to the chemically acid form. In general, any chemically neutral or basic clay is contemplated herein. Particularly preferred, however, are clays of the polygorskite group, of which attapulgite and sepiolite are typical representatives. Mixtures of two or more chemically basic or neutral clays can be employed. The particle size of the clay catalyst does not appear to be a critical factor.

Generally similar results are obtained using, in place of monoisobutylene, one of the polyisobutylenes such as diiisobutylene, triisobutylene or tetraisobutylene, in molecular equivalent amounts. Likewise, in place of toluene, one can use other monoalkyl benzenes in which the alkyl radical contains between one and 4 carbon atoms, e.g., ethyl benzene, isopropyl benzene, and t-butylbenzene. Mixtures of isobutylene reactant or of the alkylbenzenes can be used.

p-Tertiary butyltoluene can be oxidized to form p-tertiary butyl benzoic acid which can be used to upgrade vegetable oils used in surface coating applications of the alkyd resins, as well as for other purposes. The tertiary butyl alkylbenzenes formed by the present invention have high octane ratings and are valuable additives for improving the octane number of gasoline blends. Individual isomers may be used for this purpose but it is not necessary to isolate them, as the mixtures of isomers obtained in the present process can be more economically and effectively used as such.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. The process of producing tertiary-butyl alkyl benzenes which comprises contacting an isobutylene reactant and an alkylbenzene having between one and 4 carbon atoms in the alkyl radical with a natural clay selected from the group of chemically basic and neutral clays which have not been subjected to chemical treatment, at temperatures of between about 300° F. and about 600° F. and at pressures of between about 200 p.s.i.g. and about 400 p.s.i.g.

2. The process of claim 1 wherein said isobutylene reactant is mono-isobutylene.

3. The process of claim 1 wherein said natural clay is of the polygorskite group.

4. The process of claim 3 wherein said isobutylene reactant is mono-isobutylene and said alkylbenzene is toluene.

5. The process of claim 4 wherein the mono-isobutylene and the toluene are present in a mole ratio of about 1:3.35.

6. The process of producing tertiary-butyl toluene which comprises contacting isobutylene and toluene, in a mole ratio of about 1:3.35, with chemically basic attapulgus clay which has not been subjected to chemical treatment, at a temperature of between about 300° F. and about 400° F. and at a pressure of between about 200 p.s.i.g. and about 300 p.s.i.g.

References Cited by the Examiner

UNITED STATES PATENTS 2,416,022  2/1947  Schulze et al. _____ 260—671
2,813,907  11/1957  Vlugter _____ 260—671 X DELBERT E. GANTZ, *Primary Examiner.*

C. R. DAVIS, *Assistant Examiner.*